(12) United States Patent
Has

(10) Patent No.: US 8,488,189 B2
(45) Date of Patent: Jul. 16, 2013

(54) METHOD FOR THE CREATION OF A TEMPLATE

(75) Inventor: Michael Has, Erding (DE)

(73) Assignee: Océ Printing Systems GmbH, Poing (DE)

( * ) Notice: Subject to any disclaimer, the term of this patent is extended or adjusted under 35 U.S.C. 154(b) by 728 days.

(21) Appl. No.: 12/671,060

(22) PCT Filed: Aug. 4, 2008

(86) PCT No.: PCT/EP2008/060221
§ 371 (c)(1),
(2), (4) Date: Jan. 28, 2010

(87) PCT Pub. No.: WO2009/019248
PCT Pub. Date: Feb. 12, 2009

(65) Prior Publication Data
US 2010/0195124 A1 Aug. 5, 2010

(30) Foreign Application Priority Data

Aug. 6, 2007 (DE) .................. 10 2007 037 032

(51) Int. Cl.
*H04N 1/60* (2006.01)
(52) U.S. Cl.
USPC .......... 358/1.9; 358/1.13; 358/1.14; 358/1.15
(58) Field of Classification Search
None
See application file for complete search history.

(56) References Cited

U.S. PATENT DOCUMENTS

| | | | |
|---|---|---|---|
| 5,718,520 A * | 2/1998 | MacKay ..................... 400/61 |
| 5,923,013 A | 7/1999 | Suzuki et al. | |
| 6,407,821 B1 | 6/2002 | Hohensee et al. | |
| 6,762,851 B1 | 7/2004 | Lynch et al. | |
| 7,184,157 B2 * | 2/2007 | Dennison et al. ............ 358/1.15 |
| 7,242,490 B1 | 7/2007 | Palmer et al. | |
| 7,265,866 B2 * | 9/2007 | Holmstead et al. .......... 358/1.16 |
| 7,532,357 B2 * | 5/2009 | Robinson et al. ............. 358/1.9 |
| 7,839,513 B2 * | 11/2010 | Sammis et al. ............. 358/1.14 |
| RE42,290 E * | 4/2011 | Ogino ........................ 358/474 |
| 8,072,621 B2 * | 12/2011 | Ohshima .................... 358/1.13 |
| 2002/0080402 A1 * | 6/2002 | Robinson et al. ............ 358/1.15 |
| 2004/0105129 A1 | 6/2004 | Kawakami | |
| 2005/0185222 A1 | 8/2005 | Sammis et al. | |

FOREIGN PATENT DOCUMENTS

| | | |
|---|---|---|
| DE | 697 15 083 | 11/1997 |
| DE | 2006 047 436 | 4/2008 |
| DE | 10 2007 009 737 | 9/2008 |
| EP | 1 197 838 | 4/2002 |
| JP | 2006-287356 | 10/2006 |
| WO | WO 00/49489 | 8/2000 |
| WO | WO 00/68877 | 11/2000 |
| WO | WO 2008/040810 | 4/2008 |
| WO | WO 2008/104496 | 9/2008 |

OTHER PUBLICATIONS

Digital Printing Feb. 2005—Chapters 4 and 5.

* cited by examiner

*Primary Examiner* — Dung Tran
(74) *Attorney, Agent, or Firm* — Schiff Hardin LLP

(57) ABSTRACT

In a method or system to generate a template, the template is defined by content and layout information. Job chaperone data are associated with the template to control subsequent document processing processes.

11 Claims, 7 Drawing Sheets

METHOD FOR THE CREATION OF A TEMPLATE

BACKGROUND

The preferred embodiment concerns a method to generate a template.

Templates are frequently used in the generation of documents. They comprise basic contents and/or layout information for the document and serve as a document model (for example as a form) on the basis of which an individual document such as an invoice is generated and then output to an output system (for example to a printing system).

A method and a system to automatically prepare print data for a printing process is described in the as of yet unpublished Patent Application DE 10 2006 047 436. In this method, automatic presentation parameters for print data are generated. The generation of the presentation parameters occurs with, among other things, the aid of an image analysis method so that the physical variables that are associated with the print data as presentation parameters directly or after further analysis are extracted from the print data. According to known methods, output parameters with which the printing process is controlled can be developed using the presentation parameters.

Furthermore, preflight programs are known with which digital print data for offset printing can be monitored. In offset printing it is typical that initially a film is generated at which the print image can be checked. A printing plate that is used in the offset machine is exposed with this film. In digital offset printing the print data are generated and prepared digitally without it being necessary to expose a film. Since here the review at the film is omitted, preflight programs have been established with which a print image can be reviewed for correctness at a computer. Known preflight programs are, for example, PreFlight Pro™ or, respectively, FlightCheck™. Such preflight programs can also be used in digital printing methods in which at least one printing group is controlled digitally and per-pixel to generate a print image. Corresponding digital printing systems can be, for example, electrographic printing apparatuses (in particular electrophotographic printing apparatuses), inkjet printing apparatuses, ionographic or magnetographic printing apparatuses. Additional digital printing systems are described in, for example, "Digital Printing, Technology and printing techniques of Océ digital printing presses", 9th edition, February 2005 (ISBN 3-00-001081-5), Chapters 4 and 5.

Preflight programs have proven themselves well for the review of a print image in the field of offset printing. In digital printing methods, printing apparatuses with significantly different scope of services and varying print quality are used, such that the different print qualities also lead to a different realization of the print images on the print medium. However, this is a requirement for the use of preflight programs with settings that should merely transfer the functionality of the database.

Frequently documents for everyday use such as invoices, sales letters or the like are produced in large numbers with digital printing apparatuses in which typically the areal coverage of the print image can be controlled per pixel and individually for every subject (for example in that print heads can be activated individually per pixel), in which everyday documents every single produced document normally differs at least partially from the other documents, however. The documents are thereby frequently based on form templates such as, for example, an invoice form with the letterhead of the invoicing party. The differences of the individual documents are in, for example, different addresses of the invoice recipients, in different invoice amounts etc. A large variability thus exists. Therefore for digital printing apparatuses the preparation and association of the print data has a significantly greater importance than in offset printing, in which normally large editions of an identical document are produced. In digital printing methods the printing apparatuses are additionally frequently directly controlled with print data from computers. Digital printing apparatuses are, for example, electrophotographic, magnetographic, ionographic, thermotransfer or inkjet printing apparatuses. The printing apparatuses can exhibit speeds of, for example, 100 to over 1,000 pages per minute in the DIN A4 format in high-capacity printing. An additional significant difference relative to offset printing lies in the digital printing method in that the digital printing method enables significantly different print qualities depending on the printing device and selected setting. These print qualities differ primarily in the resolution and in the color space (black-and-white printing, highlight color printing with one or more highlight color colors, full color printing), On the other hand, the workflows in digital printing methods and classical printing methods (for example offset printing) continue to converge. For example, in offset printing there are already methods that handle all data digitally up to the exposure of the printing plates. Furthermore, the same printing formats—for example the Portable Document Format (PDF) are increasingly used in digital printing methods and in offset printing.

One cause for printing problems in digital printing methods lies in that the print data (and therefore also the document processing data) often originate from different sources that use the most different programs. The computer programs used for this can be provided on large-scale mainframe computer systems, for example, wherein data are extracted from large databases, but can also be typical word processing programs running on personal computers or programs for the preparation of presentations, for example Microsoft PowerPoint®. They can also be professional layout programs such as QuarkXPress®, Freehand® or Pagemaker®.

In the already aforementioned book "Digital Printing, Technology and Printing techniques of Océ digital printing presses", 9th edition, in Chapter 18.2 an Order Distribution System (ODS) is described that is also designated as a workflow manager. The entire digital printing process, which comprises a print pre-stage, a high-capacity printer and a final processing, can be controlled with this order distribution system. Image and text files from different sources (such as scanners, digital cameras, data media or a computer network) are merged in a print pre-stage and brought into their final form at a layout station. A printer driver subsequently converts the data generated on different platforms into Postscript files, for example. These files can then be relayed to a print server for printing. Print servers convert the data into compressed bitmaps that are imposed wholly automatically and relayed to the printing system. The print server controls the printing process. The final processing of the print product comprises, for example, the binding or insertion of separator sheets.

The order distribution system is moreover responsible for the central administration of the production variants. The printing service for intranet and internet users also belongs to this. The order distribution system informs users about enabled production variants, accepts print jobs together with a digital job portfolio, and initiates the automatic execution up to the printing. The order distribution system also monitors the correct execution of the selected printing and post-processing options.

The order distribution system here executes job tickets that contain the control parameters to control the printout of print data of a print job as files in a specific data format. A job ticket can thereby be generated by a user upon generation of the print job or automatically in a printing system. The job tickets have unique instructions that are to be correspondingly converted.

Document processing processes, in particular printing processes, are becoming increasingly more comprehensive since increasingly more apparatuses are integrated into the respective process, whereby the functionality increases. Additionally, such processes are increasingly executed with regional distribution via the internet and intranet, for example are associated with a pool of printers that can be regionally distributed. Moreover, apparatuses of different manufacturers must increasingly work together in a process. In order to grow to meet these increased requirements, a uniform specification for the exchange of data formats was agreed upon that is designated as a job definition format (JDF). For this there is a corresponding job message format (JMF) that is correspondingly specified. The specification of JDF can be downloaded from the Internet site www.cip4.org; and at the time the current specification is JDF Specification Release 1.3.

JDF is an XML-based format in which the process instructions are arranged in a tree structure. Every node of the tree structure comprises an instruction or a set of instructions. The uppermost node is designated as a root. The end nodes at branches are designated as leaf nodes.

A feature of JDF is that it can provide what are known as intent nodes that contain a very general instruction for a process that must be rendered more precisely in order to be able to be executed at an apparatus.

From EP-A2-1 197 838 a method for processing of print jobs in a network is known in which, using a job ticket, it is checked whether a printing service has the resources necessary to execute the print job.

A printing system with multiple different stand-alone printing apparatuses of different design and with at least one print server arises from WO 00/49489 A. The print server receives print data from a print data source and distributes them to the stand-alone printing apparatuses. If the printing system contains the pre- and post-processing apparatuses associated with the printing apparatuses, a page-precise tracking of the print pages is implemented. A page-precise restarting of the printing operation can thereby occur if a fault occurs in one of the apparatuses.

In WO 00/68877 A a method is described in which print data are provided for printing in a logical page order corresponding to one or more signatures. The provision can occur within a production process for print goods (workflow) (for example in a host computer); in a computer upstream of a printing apparatus (print server); or also at another workstation (client computer). The provision in particular occurs as an imposition pattern in a production control program.

A system to print hybrid documents arises from US 2005/0185222 A1. What are to be understood by hybrid documents are those that have regions that are to be printed both in color and in black-and-white. This system has a color printer and a black-and-white printer. The corresponding pages are separated with a print manager and supplied to the respective printing apparatus. At the output of the system the pages printed by the different printers are automatically sorted in the correct order. This sorting takes place in the black-and-white printer to which the recording media printed by the color printer are supplied. With this system it should be avoided that a plurality of recording media are printed with only a single color at a color printer.

From U.S. Pat. No. 6,407,821 B1 it is known to integrate objects of other print data languages such as Postscript (PS) or Portable Document Format (PDF) into data streams of the Advanced Function Presentation (AFP) and Mixed Object Document Content Architecture (MO:DCA) print data languages (whose command sets also correspond in large part to those of the Intelligent Printer Data Stream (IPDS) print data language), what is known as embedding. For this special identifier fields (what are known as object container identifiers) are provided in the data streams or, respectively, the print data languages that enable it to reference the objects of the other printer languages as resources. For example, individual or multiple pages in the PDF format can thereby be embedded as an object into an AFP print data stream.

In the book "Digital Printing Technology, and Printing Techniques of Océ Digital Printing Presses" (at the cited location), in Chapter 15 a server system designated with the trade name Océ PRISMAproduction® is described that processes or converts a broad palette of data sets that are then printed on high-capacity digital printers in the Intelligent Printer Data Stream (IPDS) print data format. The Oce PRISMAproduction server system comprises a print job manager PJM (see Chapters 15.2.4 and 18.2) with which print jobs are generated at an arbitrary customer client and executed and administered in this server system. The print job manager is also designated as a print job manager.

Software modules that attend to central tasks are designated as "servers". Software modules that are connected to a server and receive data from the server or communicate data to this are designated as "clients". Multiple clients can simultaneously be in contact with a server.

In client/server systems, print jobs are normally generated by the clients. A print job comprises the print data to be printed and a job ticket that contains control parameters to control the output of the print data.

The incoming print jobs are monitored and possibly modified at the clients upstream of the print job manager. This modification can comprise data or information accompanying the print job, wherein the content of the job ticket is adapted to the print environment. It is also possible that a job ticket is created in the first place at the print job manager from the data accompanying the print job and a specification ticket present at the print job. The format of possible incoming job tickets is for the most part appropriate; however, parameters are often contained in these that are not usable or even lead to conflicts. Job tickets thus possibly contain printer names that are not present in the existing printing system. To correct such incorrect job tickets, computer programs that automatically monitor the job tickets and correct them as necessary are provided at the clients. These computer programs are programmed individually as scripts for the individual clients and their applications or, respectively, the respective source of the print job. It is also typical that multiple such scripts are provided at a client in order to respectively revise different sources or job tickets with print data in different data formats. These scripts have proven to be very useful because the incoming print jobs are automatically monitored and adapted with these so that the entire printing process can run without delay.

Methods to automatically process process data instructions in the form of job tickets in a print server are described in the not previously published Patent Application DE 10 2007 009737.

The aforementioned publications and as of yet unpublished Patent Applications are herewith incorporated by reference into the present Specification.

For a better understanding of the present preferred embodiment, a few terms are explained in the following:

A complete job contains at least one document processing job, in particular a print job.

A print job (job) contains at least one print file to be printed.

A complete job ticket (order ticket) contains information about a complete job, for example delivery address, job date, desired delivery date etc.

A job ticket contains data usable to execute a print job. These data comprise control parameters that are relevant in a workflow for the print job (job workflow). The job ticket is encoded in a corresponding ticket format.

A specification job ticket contains standard data that are suitable to output a print job that contains no additional processing information in an existing printing system or an existing print environment. Such data are control parameters and can, for example, be names or addresses of printing apparatuses that are connected to the respective print server.

What is to be understood by a data ticket is information that is generated by a system generating a print job, for example print job generated by (mainframe computer system) together with the print data. Depending on the system, the scope of such data can be very limited and/or their format can possibly be non-standardized, which is why they are not viewed as job tickets in the above sense.

The job chaperone data can comprise both a complete job ticket, a job ticket and/or a data ticket or control parameters that are attached to a print job in a different form. Control parameters are more often inserted into the file name of the print job. These job chaperone data can in fact exist in the most different forms (job ticket, file name etc.). However, the are always explicitly present.

A template is a document specification that is characterized by content and layout information. Such templates are provided and used in current word processing systems and desktop publishing systems, for example in the widespread word processing system Microsoft Word. The layout and frequently also a portion of the document content is prepared or set as a form by means of known templates.

What is to be understood by an image in the following is, in the broadest sense, the particular graphical presentation or reproduction of a data object (in particular a document page), and in the narrower sense a data object that is encoded, presented or reproduced in a rastered format (image format, pixel format) or a vector format.

SUMMARY

It is an object to achieve a method to generate and process templates that enables it to incur fewer errors in the output (in particular in a printout) of documents that are based on templates generated in this way than with conventional templates.

In a method or system to generate a template, the template is defined by content and layout information. Job chaperone data are associated with the template to control subsequent document processing processes.

DESCRIPTION OF THE PREFERRED EMBODIMENT

Figure 1:
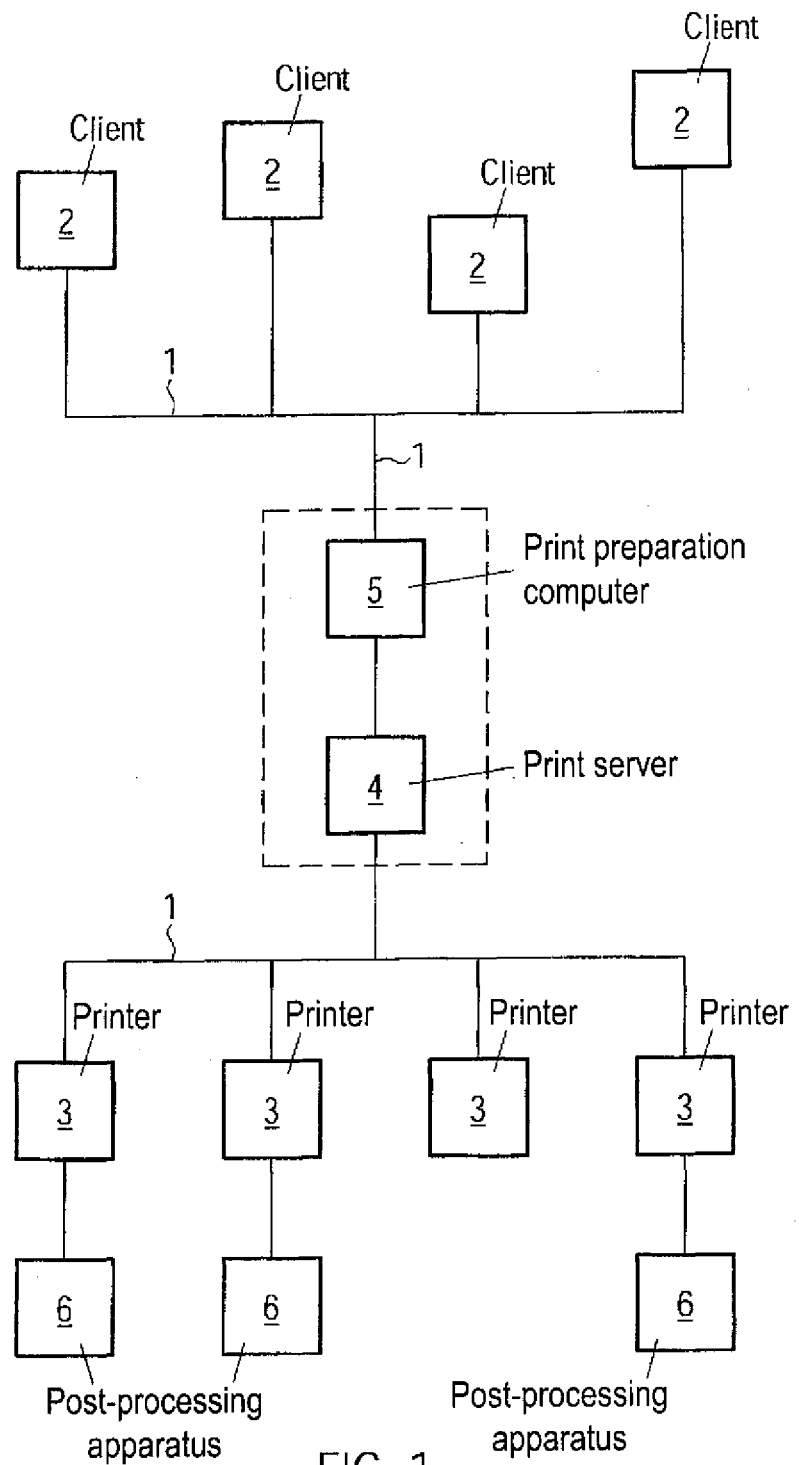
FIG. 1 is a network with a print environment in which a method according to the preferred embodiment can be executed.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and method, and such further applications of the principles of the invention as illustrated as would normally occur to one skilled in the art to which the invention relates are included.

With the preferred embodiment, not only layout and/or data contents of a document are provided via the template; rather, subordinate document processing steps are also established that can reach far beyond the original generation of the document. For example, with such job chaperone data it can be defined that a printer or printer tray is activated that contains DIN A4 paper. It can hereby be ensured that the print data contained in the document projection job are printed on a recording medium in the DIN A4 format. Such a control parameter would be advantageous for the tickets received online from the Deutsche Bundesbahn. Such tickets contain an instruction "Please print on A4" contained in the text. If printed out on a different format, in particular a smaller format, it can be that the ticket—which contains a two-dimensional barcode—can no longer be read by a machine. If this ticket were generated with a template that would contain the job chaperone data that control the subsequent document processing process such that the ticket would be printed out on a recording medium in DIN A4 format, the user could not incorrectly print the ticket at all, and the instruction in the text of the ticket could be spared. This example also shows the difference between layout information and job chaperone data. The online tickets previously generated by the Deutsche Bundesbahn contain the layout information of the DIN A4 format. In contrast to this, job chaperone data contain control parameters that initiate the execution of a specific document processing process. In the present case, this means that a recording medium in the DIN A4 format is actually printed in that either the corresponding tray in a printer is activated or a corresponding printer is activated. In contrast to this, the DIN A4 layout information merely describes the shape of the print data. Using the DIN A4 format allocation, the print data can hereby be enlarged or, respectively, reduced accordingly during a document processing process in which they are printed out on a different format so that they match the other format. A control of a document processing process does occur via the layout information.

An additional important group of control parameters are security-relevant control parameters that control the document printing or, respectively, the document handling in a corresponding manner. For example, such control parameters establish that a document that is based on a security-relevant template is printed exclusively at a specific printer that, for example, is situated in a sealed, access-controlled room, and that this document cannot be sent via e-mail. Additional security-relevant control parameters are, for example, that documents to be printed are printed only on a system in which a post-processing apparatus to envelope the printed documents is connected to envelope and are not accessible to third parties without damaging the envelope.

This portion of the preferred embodiment represents an independent inventive idea that can also be applied independent of an aspect of the preferred embodiment explained in the following, i.e. that the job chaperone data that are coupled with the template can be generated by means of an arbitrary method or are entered by hand by a user. However, the job chaperone data can naturally also be generated with the method according to the aspect of the present preferred embodiment that is explained in the following.

According to a first aspect of the preferred embodiment, a method is provided to automatically prepare document processing data that comprise document data (in particular print data) with job chaperone data. In a document data analysis, in particular print data analysis, the document data are analyzed according to predeterminable document data criteria, in particular print data criteria. In a job chaperone data analysis, the job chaperone data are analyzed according to predetermined job chaperone data criteria. The two analysis results are then linked according to predeterminable linking criteria and combined with job chaperone data obtained from this. The meta-information in particular represents information only implicitly contained in the document data and/or job chaperone data and relevant to a subsequent document processing process and are used to control the subsequent document processing process. The document data can in particular be print data, and the document processing process can in particular be an output process executed at an output apparatus, for example a printing process executed at a printing apparatus. The output process can be an even more complex process in which different output apparatuses are participating. For example, both an e-mail server and a printing apparatus can be participating in the output process for a parallel output of the document in printed form and as e-mail.

According to an advantageous exemplary embodiment of the first aspect of the preferred embodiment, additional process data describing the subsequent document processing process are drawn upon and/or analyzed in the linking of the two analysis results of the document data and the job chaperone data or given the use of the meta-information to control the subsequent document processing process, and the results of the analysis are converted into additional, explicit job chaperone data to control the subsequent document processing process and are added to the document processing data.

According to the method according to the preferred embodiment, implicitly contained meta-information can be derived from the print data. For example, this can occur with the method known from DE 10 2006 047 436 for the automatic determination of presentation parameters by means of image analysis methods. Therefore the full content of DE 10 2006 047 436 is again referenced at this point. This implicit meta-information comprises, for example, semantic contents of print data or of segments of the print data (text, images or photographic images).

Furthermore, in the method according to the preferred embodiment meta-information can be obtained from the combined analysis of at least two data types of the types "print data", "job chaperone data" and "process data", wherein the "process data" describe the subsequent document processing process. In the combined analysis, predeterminable rules are applied for linking the individual partial analyses. The analysis result of the combined analysis is in particular determined by a process logic that has predeterminable parameters. The analyses, combinations and control processes are in particular implemented automatically, assisted by computers by means of software.

The process data comprise, for example, information about the available printing apparatuses and post-processing apparatuses or the available recording medium and their properties, such as size, grammage or paper quality. The meta-information is thus correlated with the document processing process or the possible document processing processes, and job chaperone data to control the document processing process are determined from this. The process data are advantageously generated or updated automatically. There is thus a communication from the individual apparatuses of the print environment (in particular the printing apparatuses) with the computers at which the document processing data are prepared or generated.

For example, this communication can be implemented by means of MIBs (Management Information Bulletins). The MIBs are based on the SNMP protocol with which data about the document processing apparatuses that can be queried automatically by the print servers and/or client computers are provided in standardized form.

Another form of the implementation of this communication occurs by means of digital agents that collect the data of the individual document processing apparatuses automatically and relay them to the desired print server or client.

Since the document processing process in the digital printing method is dependent on a plurality of the most different parameters, the meta-information contained in the print data is brought into agreement with these and converted into corresponding job chaperone data. For example, if the print data contain a full-color image that, based on its semantic content, should be printed on a recording medium that is larger than DIN A4, among the possible document processing processes those are selected that can print in full color on recording media in the DIN A3 size and larger. The number of the potential document processing processes or the number of the potentially available printing apparatuses is hereby significantly reduced. Additional meta-information or additional already-present job chaperone data and print data can then be reconciled with the specific parameters of the different and possible document processing processes, and explicit job chaperone data can be generated.

Presentations are for the most part created in a program provided for this, for example Microsoft Power Point®. Individual slides of these presentations should then often be printed over a large area in color in order to use them as plates or the like in displays. Presentation programs are, however, not provided in order to print large-area documents with these. For the most part they merely possess a resolution of 72 dpi. In the method according to the preferred embodiment it is automatically detected that something is a presentation. It can also be automatically detected what type of graphics this presentation contains. If the information that a large-area print output should be generated from this is contained in the corresponding job chaperone data, with the method according to the preferred embodiment a document processing process can then be controlled via generation of corresponding job chaperone data. This document processing process advantageously contains digital pre-processing steps before the actual printing process, for example the conversion of the format into a PDF format with predetermined resolution or the processing of the print data with special rastering methods that enable a large-area printout of the original images shown with low resolution.

According to a second aspect of the present preferred embodiment that can also be viewed independent of the first aspect of the preferred embodiment, the following method steps are executed in series:
  process data that describe the subsequent document processing processes of different output apparatuses, in particular printing apparatuses and/or other document processing apparatuses, are generated or updated and in particular analyzed automatically,
  the process data are compared with document processing data that comprise document data (in particular print data) and job chaperone data in order to select a group of output data with which the document data are to be printed, and
  job chaperone data are generated that are optimized with regard to the selected output and/or document processing apparatuses.

With this method, using the automatically updated process data a group of output apparatuses (in particular printing apparatuses) is selected so that the job chaperone data can be automatically generated very specifically. It is hereby possible to automatically generate job chaperone data that are very specific in an environment with many different output apparatuses or even different apparatuses of the same type, for example different printing apparatuses (what is known as a heterogeneous print environment), since the selection of the output apparatus occurs automatically using the process data. This method is in particular suitable for digital printing methods but also for other analogous printing methods that provide the necessary process data for an automatic querying to the corresponding apparatuses.

Within the scope of the preferred embodiment it is also possible that, instead of a group of printing apparatuses, a specific printing apparatus is selected at which the print data can be printed.

Here the job chaperone data can be generated directly from the process data. However, it can also be appropriate to combine this method in connection with the method according to the first aspect of the present preferred embodiment so that the document data (in particular print data of a document data analysis and the job chaperone data) are subjected to a job chaperone data analysis in order to generate additional job chaperone data.

According to a third aspect of the preferred embodiment that can also be viewed as independent of the aforementioned aspects, a method is provided to monitor the document data (in particular print data) in which the document data are analyzed for meta-information implicitly contained therein that is relevant to a subsequent document processing process. This implicit meta-information is converted into explicit job chaperone data to control a document processing process and added to the document data. Using these added job chaperone data, a check occurs for errors or completeness. If necessary a corresponding message is output. In particular, an output apparatus for the document processing job can then be controlled by means of the explicit job chaperone data.

With this method the document data can thus be checked with regard to potential document processing processes, wherein a comprehensive check can occur via the job chaperone data derived from the implicitly contained meta-information. In particular, semantic contents that are automatically established can also be taken into account as well in the check. Depending on the determined semantic contents, suitable document processing processes or document processing process classes can thus be established and it can be checked whether the already present or added job chaperone data match these document processing processes or classes or are complete for these. In the event that is not the case, either an error message is output or a message is output with which a manual expansion of the job chaperone data is requested. A corresponding suggestion list can be output in which a user can select one or more suitable items of job chaperone information that are added to the document as job chaperone information.

This check is in particular suitable to check print data during or immediately after the production of the print data since, with consideration of the meta-information contained therein, corresponding instructions can be provided to the generator of the print data as to via which job chaperone information the print data are to be expanded or whether errors exist. The print data can thus be optimized with regard to suitable document processing processes. Template documents can herewith also be generated that are already provided with explicit job chaperone data. These template documents can, for example, be in forms used by a specific firm, be templates for presentations or other templates for text that are used repeatedly by different employees and that are provided with job chaperone data optimized for the respective template document.

However, this check can also be executed at a layout station (in which data from different sources are merged), a job processing system (order distribution system), a generator or a print server. The closer that the computer at which the method is executed is arranged the printing device and the post-processing apparatuses in the workflow of the document data processing, the more precise the information that are available across the print and post-processing environment, and the more precise the information that can be taken into account in the checking of the print data with regard to the document processing processes.

In the method according to the first aspect of the present preferred embodiment, job chaperone data are generated to control the following document processing process. These job chaperone data can in particular be coupled to templates to control the subsequent document processing process. For example, this can occur in that the job chaperone data are stored at least partially in a template file, and/or that the job chaperone data are referenced within the template file. A template is a model file that requires additional data contents so that the model file becomes a complete document. The coupling of the job chaperone data to the template advantageously occurs in that a job ticket in which the job chaperone data are contained is associated with the template. However, the job chaperone data can also be coupled to the template in a different form, for example be integrated into the file name of the template. According to the preferred embodiment, job chaperone data coupled in such a way to templates are processed in the course of the further processing of the template, for example in the generation of a document, in the generation of a print file and/or in the processing of the files according to the other aspects of the preferred embodiment.

The method according to the preferred embodiment for the automatic preparation of document processing data and to check print data can generate job chaperone data with high importance for the processing process primarily via combination of the most different information for example, given a document in which graphic data and text data are combined, suitable rastering methods for the graphics and the text that, on the one hand, ensure the processing time in the rastering is kept low but on the other hand ensure a good print quality can be determined from the importance of the graphic data (business graphics, map, scientific diagram, firm logo etc.) and the size of the graphic in the document and the format of the document, the font type of the text and the font size of the text.

The optimal rastering method depends strongly on the resolution of the printing format and the size of the individual elements (graphics, text) of the print data.

According to a fourth aspect of the present preferred embodiment that can also be viewed independent of the other aspects, job chaperone data are encapsulated into document data with a predetermined document data format by means of macros, wherein the encapsulated job chaperone data are represented in a different document data format. The document data can in particular be print data and the document data formats can in particular be print data formats.

Macros here are a sequence of commands in a specific programming language. These programming languages are in particular page description languages (such as Postscript) with which print data can be defined. An encapsulated macro contains commands in a first programming language or a first print data format that is encapsulated in a second programming language or a second print data format that differs from the first print data language or the first print data format, wherein in the second programming language a data structure is provided for this that leaves the content of the macro (and therefore the command sequence contained therein in the first programming language) untouched in the execution of the second programming language. The commands contained in the first programming language in the macro are executed only if the remaining region of the document has also been converted into the first programming language and been executed in this, for example by means of a corresponding interpreter.

Print data formats in digital printing normally represent a programming language. The Postscript print data format is thus a Turing-complete, stack-oriented programming language with which practically any programming tasks can be solved.

A first print data format in which the commands contained in a macro are presented can be the print data format that is used at a print server or in the controller of a printing device in order to convert the print data stream from the print data in this format into the form of bitmaps in a rastering process to control the character generator of the printing device. In an early stage of the generation of the document processing job, job chaperone data that, on the one hand, are not lost and, on the other hand, reliably control the desired document processing processes can hereby be added to the document processing job in an early stage of the generation of the document processing job since they are not subject to any conversion.

This is appropriate if the document data existing in a specific data format—for example the data formats of Microsoft Word® (.doc) or Microsoft Power Point® (.ppt) etc.—are converted once or repeatedly into other document data formats in the document processing process, in particular into print data formats. Often document data (in particular also print data) are thus converted into the PDF format for archiving.

Often the job chaperone data or job ticket of the first print data format are lost in the conversion from one print data format into another print data format. However, there are print data formats (for example Postscript) that survive such conversions from one print data format into another print data format unchanged as encapsulated files. If, in the printout on a printer, a corresponding Postscript file is generated from the print data, the job chaperone data are then entered into the encapsulated Postscript file in the print file and taken into account in the processing. The job chaperone data can merely consist of a form name which is called into the printing process to print out the print data. On the other hand, it is also possible that the job chaperone data contain multiple specific instructions for the printing process, for example the number of copies, print format, the color space to be used etc.

This aspect of the preferred embodiment also represents an independent inventive idea that can be applied independent of the use of the meta-information implicitly contained in document data (in particular print data). The data format of the encapsulated file is, for example, a print data format that is not separated from the print data in the subsequent processing and is automatically entered into the print data by the document processing processes and is herewith activated. The format of the print data stream used in the respective printing apparatus to be used (for example Postscript, IPDS or PCL) is advantageously used for the data format of the encapsulated print data files.

For specific file templates, corresponding macros can be provided that are copied into the file template in order to add suitable job chaperone data to the file template. With this method it is possible to provide print files with job chaperone data as they are provided in a professional print environment although the print data are generated with programs that are not suitable for professional print environments or are not compatible with them.

According to a fifth aspect of the present preferred embodiment, a document data stream containing document processing data is analyzed by means of a document data analysis. Regions (in particular pages) of the document data stream that contain specific meta-information are thereby determined automatically. Using this meta-information associated with the regions of the document data stream, job chaperone data for different control of a subsequent document processing process per region are generated automatically. The document data stream can thereby in particular be a print data stream, and the document data formats can in particular be print data formats.

The meta-information associated in individual regions or pages of the print data stream are advantageously the information as to whether a single-color printing, highlight color printing or full-color printing is executed, wherein then the corresponding job chaperone data to execute the different printing methods are formed and the different printing methods are executed in succession in a printing apparatus.

In an alternative embodiment of the invention, the regions that are to be printed with the same printing method are combined into groups, wherein the regions of one group are respectively printed in succession. The regions can hereby be pages or signatures. They are sorted automatically in the desired order after the printing process. The collection and sorting of the differently printed regions advantageously occurs in suitable post-processing apparatuses.

With this method according to the preferred embodiment it is in particular also possible to automatically detect regions within individual files, to extract from these the corresponding meta-information and to generate job chaperone data.

A system according to the preferred embodiment for the automatic preparation of document processing data for a document processing process advantageously comprises a computer, wherein this can also comprise specific logical processors such as freely programmable gate arrays (FPGAs) or application-specific integrated circuits (ASICs) or can be formed by these.

In the exemplary embodiments, printing apparatuses are frequently cited as output apparatuses for documents. Printing apparatuses are specific embodiments of document output apparatuses. Other types of document output apparatuses are, for example, e-mail systems, archiving systems and monitors together with their associated data processing systems. Insofar as specific output apparatuses are cited in the exemplary embodiments, it is normally self-evident that other output apparatuses can also be used in this context.

For example, an advantageous application of the preferred embodiment connection with monitors can ensue if a document was printed on the one hand and was sent to a person, and on the other hand the document and its job chaperone data was stored in an archive (possibly was additionally converted beforehand into another data format, for example from Postscript into PDF). If the person has a question regarding this document and the archived document is presented on a monitor, for example, by an employee via a call center, it is thus desirable that the document retrieved from the archive is shown exactly like the printed document. This is possible via the analysis, control and provision of document data, job chaperone data and data for screen presentation according to the preferred embodiment.

FIG. 1 shows a section of a network 1. Multiple client computers 2 are arranged in the network 1. Programs to generate print data are stored on the client computers 2 such that they can be executed. Such programs are, for example, text programs, drawing programs, DTP programs or other programs to generate print data. These programs can typically be workstation programs that generate print data in one of the typical printer languages such as Postscript or PCL. However, they can also be professional application programs that generate print data in a document processing data stream, for example AFP or IPDS.

The print data should be printed out at a printer 3 via the network 1. Multiple printers 3 and post-processing apparatuses that receive their print data via a print server 4 are provided in the network 1. A print preparation computer 5 is arranged between the client computers 2 and the print server 4. The print preparation computer 5 receives the print data streams from the different client computers 2 and prepares the print data for relaying to the print serve 4. The print preparation computer 5 can also store print data that are merged with other print data into a print job at a later point in time. The client computer and the print preparation computer 5 can execute different image processing procedures depending on which print server or which print servers they should supply with print data.

According to the preferred embodiment, computer programs to execute an image processing procedure are provided at the client computers 2 and/or at: the print preparation computer 5, with which computer programs meta-information implicitly contained in the print data and job chaperone data are extracted automatically, and this meta-information is used to generate additional, explicit job chaperone data.

Figure 2:
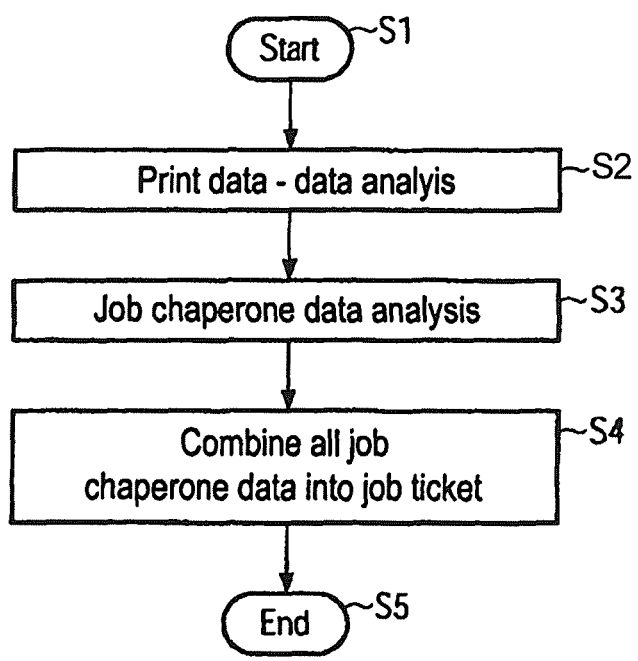
FIG. 2 is a flow diagram of a method to analyze and generate job chaperone data.
Figure 3:
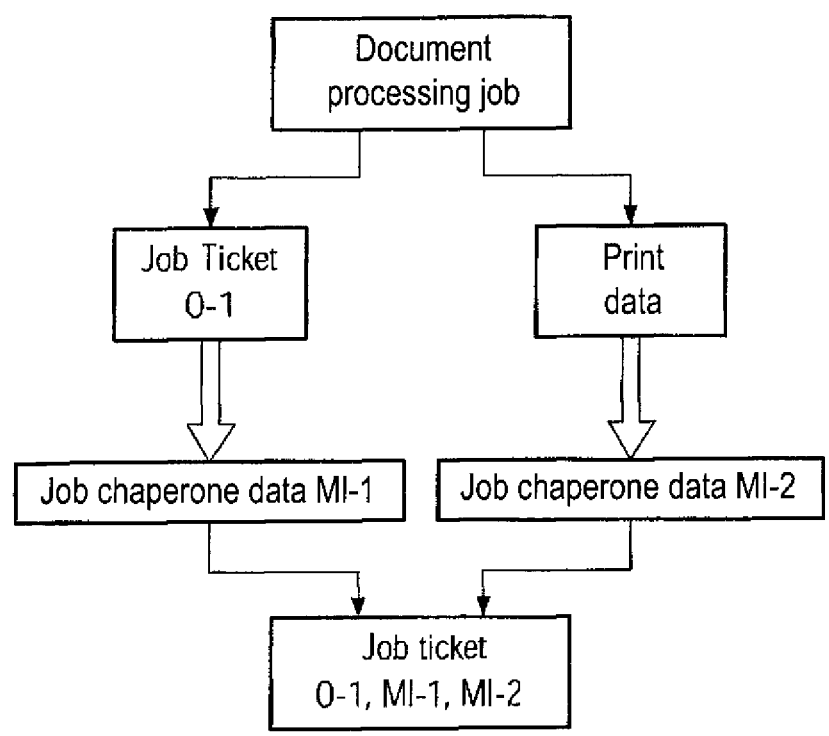
FIG. 3 is a method to execute and process data of a job ticket.

The method according to the first aspect of the preferred embodiment is presented in the flow diagram shown in FIG. 2. It begins with Step S2. In Step S2 a print data data analysis is executed. A document processing job contains both print data and job chaperone data. In the print data data analysis the print data are analyzed without the job chaperone data. Print data contain the information describing the print image as well as advanced layout information. The print data are analyzed according to predetermined print data criteria in order to derive job chaperone data (MI-2; see FIG. 3). In the print data data analysis, the process data describing the subsequent document processing process are taken into account, meaning that the print data are analyzed with regard to the following document processing process and job chaperone data for the optimal control of the document processing process are generated. The print data data analysis explained in further detail below.

A job chaperone data analysis is implemented in Step S3. The orders of the print data data analysis and the job chaperone data analysis are established. The two analyses can also be conducted simultaneously.

In the job chaperone data analysis the job chaperone data contained in the document processing job are analyzed. In the example according to FIG. 3, the document processing job receives a job ticket in which original job chaperone data (O-1) of the document processing job are contained. These job chaperone data are analyzed using the process data by means of predetermined job chaperon data criteria in order to generate additional job chaperone data (MI-1).

After the print data data analysis and the job chaperone data analysis, three sets of job chaperone data (O-1; MI-1; MI-2) are present. In Step S4 these three sets of job chaperone data are combined and stored in a new job ticket of the document processing job. The merging of the three sets of job chaperone data occurs in the simplest case via copying of the job chaperone data into a job ticket file. However, the three sets of job chaperone data are advantageously analyzed for conflicts in Step S4 and linked with one another according to specific linking criteria. Here in particular the order with which the individual control parameters of the job chaperone data are inserted into the newly created job ticket is established. Furthermore, job chaperone data that control a similar control function are adapted to one another or are chosen according to predetermined priorities. This is regulated by means of the linking criteria.

Since the process data have been taken into account in the print data data analysis and the job chaperone data analysis, the newly generated job chaperone data are optimized for the subsequent document processing process.

If the job chaperone data are generated, the method ends in Step S5 (FIG. 2).

Figure 4:
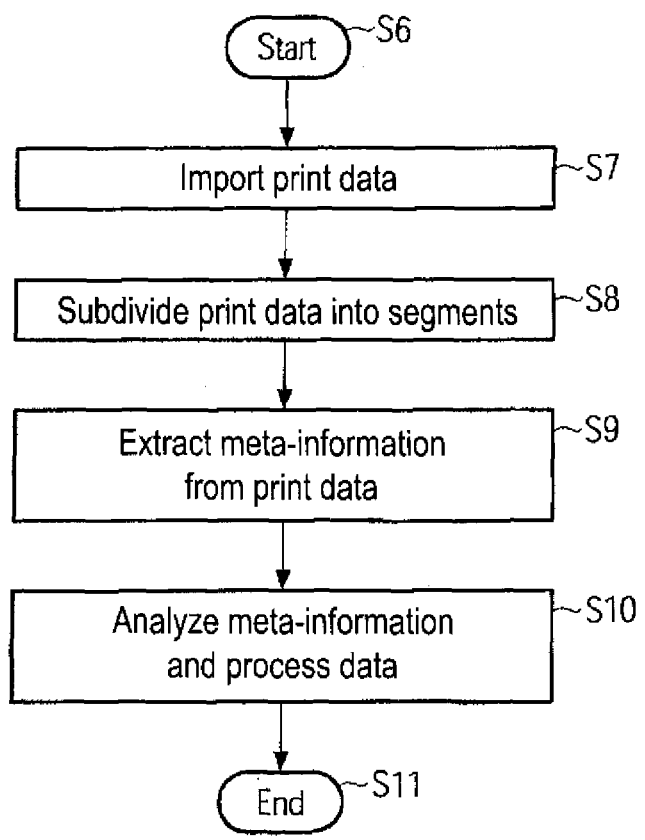
FIG. 4 is a method for a print data analysis in a flow diagram.

The method of print data data analysis is subsequently explained in detail using FIG. 4. The print data data analysis begins with Step S6. In Step S6 print data are imported either from a client computer or the print preparation computer 5. The print data are subdivided into segments. This subdivision of the segments can, for example, occur such that every print page forms an individual segment. Often, however, the print data do not contain any per-page subdivision, for example given a long text that is divided up into printer-specific pages depending on the printer at which it is printed out. Since often no information about the printer is present at the generation of the document data, a printer-specific processing of the print files in advance is not always possible. The print data are then subdivided into segments according to a different rule. It can also be that a specific set of incoming print data is treated as a single segment.

Print data that have regions with different image data types are advantageously subdivided into segments, wherein every segment comprises a specific image data type (Step S8). Different image data types are, for example, text data, images in vector graphics or images in pixel graphics (or bitmaps). Every region that comprises such an image data type is identified as a separate segment.

However, it is also possible to adopt a data structure already contained in the print data and to subdivide the segments accordingly. It is hereby possible that different image data types are also provided within a segment.

The individual segments are subjected to an image analysis method (Step S9) with which one or more physical variables of the respective image segment can be determined automatically. These physical variables are, for example, the brightness, the contrast, the object-dependent resolution, the detail richness of an image, the sharpness and the color dynamic of the image. What is understood by "object-dependent resolution" is the resolution that is necessary in order to be able to depict the image content without information loss. The smaller and finer that the individual objects or elements of the image are designed, the higher the object-dependent resolution must be for a qualitatively high-grade output.

Different methods are provided in the prior art for the extraction of these physical variables (see for example Bernd Jähne; Digital Image Processing, 6th Edition 2005, ISBN 3-540-67754-2, Springer Verlag Berlin, Heidelberg, New York, III Feature Extraction, Pages 299-446). In addition to the physical variables extracted by means of the image analysis method, innate parameters can also be contained in the data set as meta-information, for example in the layout data of the print data. Such innately contained parameters are, for example, the resolution of a bitmap file that is to be differentiated from the object-dependent resolution and that indicates in which resolution the pixels of the bitmap file are stored. An additional parameter innately contained in the data set is the color depth, which can typically assume values of 1 bit, 10 bits, 12 bits. The data sets also for the most part contain information about the respective image data type so that these data can be directly learned from the print data and do not always need to be extracted by means of the image analysis method.

The method with image analysis just described can in particular occur according to the method described in DE 10 2006 047 436.

Both the physical variables and the data innately contained in the data structure of the data set are information that is not explicitly contained in the print data or in the job chaperone data belonging to the print data. This information is therefore designated as meta-information. All information that is derived from this meta-information via a further analysis also belongs among the meta-information.

Semantic contents of the individual segments can thus be determined via such an additional analysis. In the present exemplary embodiment, semantic contents of three levels are differentiated, namely a base level, a middle level and an upper level.

The base level comprises fundamental semantic contents such as, for example, edges and individual objects in the respective segments. Different methods to detect edges and objects are known.

The middle level of the semantic contents comprises texts, images (with the exception of photographic images) and photographic images. Photographic images are images with predominant grey levels or color curves and few individual lines. The other images are images with no or only grey levels or color curves with small dynamic ranges. Such images often have thin drawn lines.

The images and photographic images are again subdivided according to semantic contents in the upper level. The images comprise, for example, maps, business graphics, technical/scientific diagrams (graphs) and plans. The photographic images in the upper level are subdivided into, for example, landscape images, portraits and product images.

There is an additional plane of semantic contents subordinate to this in which are comprised multiple segments of the print data that together form a contiguous print data unit that is designated as a work. Such works are, for example, invoices, personalized sales letters or newspapers. For example, it is known to print newspapers from specific publishers in remote countries in a smaller print run in a special format on electrophotographic printers so that the subscribers of this newspaper can also receive the corresponding newspaper copies in the foreign country. The quality requirements for such a newspaper printing are relatively low, such that this global meta-information has effects on all segments. In contrast to this, given invoices average quality requirements are desired, in contrast to which high quality requirements are placed on the printout given personalized sales letters so that the sales letter can be successful.

The type of the work (which is also designated as a target genre) requires predetermined processing methods to which the printer is to be correspondingly set. The target genre thus represents meta-information.

In the following it is explained using a few examples how additional meta-information can be automatically discovered.

In maps, the colors blue (oceans and lakes) and green normally form larger contiguous surface regions, in contrast to which the colors yellow, red and black are provided with narrow lines (paths, streets and bars or, respectively, small areas of red for communities an cities). This feature structure can be automatically detected and established as a map.

Portrait photos are detected such that a head of the portrayed person is detected as an object. This image object has typical features in shape and color. The same applies for business graphics and technical/scientific diagrams.

The analysis of the semantic contents can occur on the basis of the data formats of the respective objects if these formats are already suitable for the image analysis or for the respective available analysis tool, for example the JPEG or TIFF formats given images. Otherwise it can also be provided to convert the formats of the objects into suitable formats. For example, a vector object that is overlaid with other image elements in the document can initially undergo a rastering process, then is overlaid with the image elements, and finally can be analyzed.

To extract the physical variables of the print data and to determine the semantic contents, mathematical methods (such as Fourier analysis), expert systems, filters and/or neural networks can in particular be applied individually or in combination. Furthermore, fractal image analysis methods with which self-similar segments of an image are extracted can be used to extract the physical variables of the print data and to determine the semantic contents. The Fourier analysis is primarily used to determine frequency distributions with regard to the brightness and/or color of the images. These analyses are applied either to the entire image or to individual color separations.

Multiple feature images of a segment can be generated in the implementation of these analysis methods. Such a feature image is, for example, an image of what is obtained by deriving the grey levels of the initial image. Such an image is often very advantageous for the determination of the edges. The individual presentation parameters listed above can be obtained using multiple different feature images of a segment.

There are innate parameters—for example the color space (black-and-white, HLC, full color space)—to which meta-information corresponds that is obtained by means of the image analysis, for example the color distribution with which the amount or the frequency of the respective primary colors in a specific color segment is designated.

If the meta-information is, for example, the "map" parameter, the color blue can be printed with lower resolution, in contrast to which the colors red, yellow and black that reproduce the streets and legends should be printed very precisely with high resolution. Since the visual sensation for the color black is significantly stronger than for the color yellow, it can also be appropriate to print the color black with higher resolution than the color yellow.

The analysis of the print data can also be executed such that a set of segments with corresponding presentation parameters are stored in a database, wherein the meta-information is associated with a segment that this new segment is compared with the example segments present in the database and, in the event that the new segment coincides within a certain degree with an example segment present in the database, the meta-information of the existing example segment with which it coincides is associated with the new segment. This method can also be implemented in combination with the image analysis method described above, wherein if a new segment is not analyzed by such a comparison since there are no sufficiently similar example segments in the database, it is accepted into the database together with the presentation parameters. The method hereby additively learns, whereby the analysis times can be shortened with increasing usage of the method since now more example segments are provided.

The meta-information generated automatically according to the preferred embodiment are derived solely from the print data and the job chaperone data associated with them and therefore are, in principle, independent of the printer.

The meta-information is analyzed together with the process data in Step S10. The process data describe the subsequent document processing processes or the potential document processing process classes. The process data comprise parameters that characterize the document processing process executed on the subsequent apparatuses, the print preparation computers 5, the print servers 4, the printers 3 and the post-processing apparatuses 6. The print data data analysis is ended with Step S11.

Figure 5:
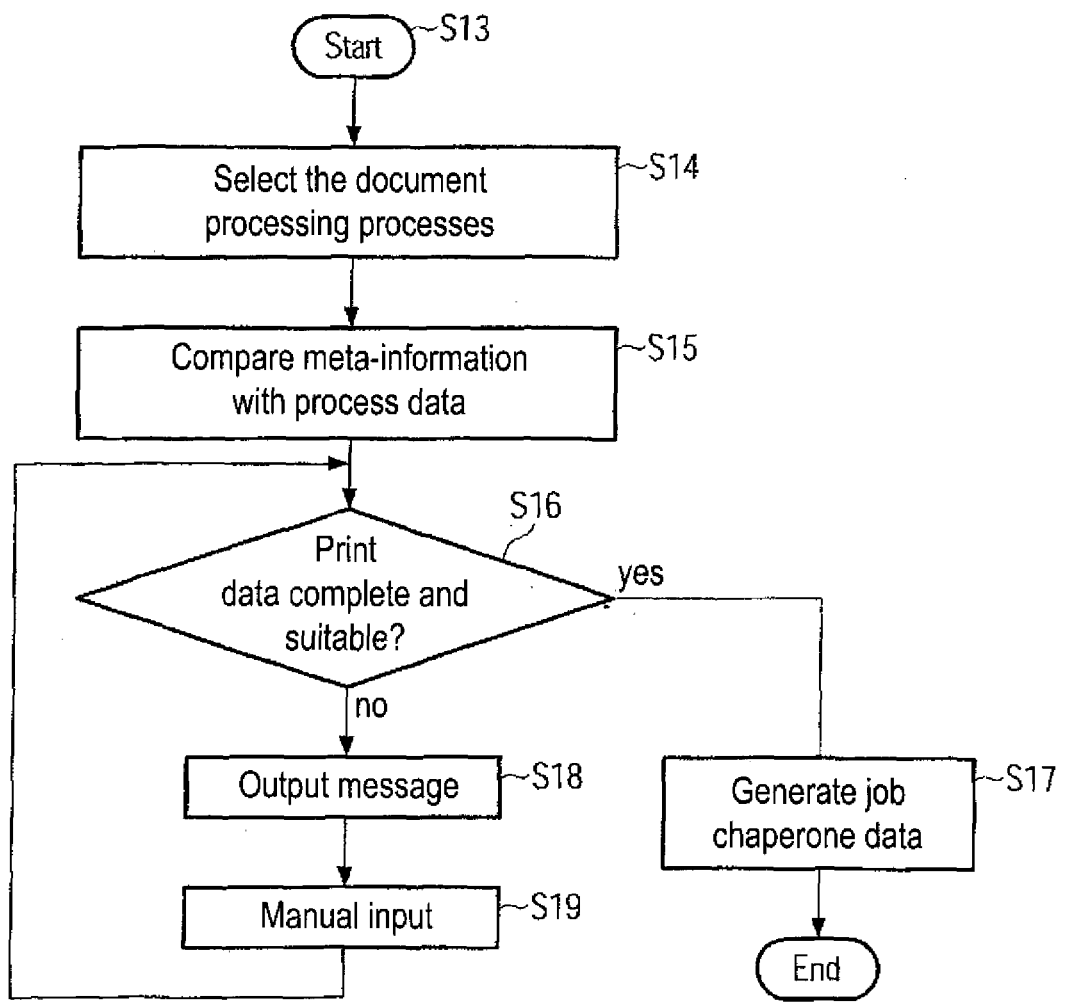
FIG. 5 is a segment of the method according to FIG. 2 in more detailed presentation in an additional flow diagram.

The analysis of meta-information and process data (Step S10) is explained in detail in the following using FIG. 5. This method begins with Step S13.

In this analysis the document processing processes downstream of the print data are thus considered. The document processing processes that are suitable for the present print data are hereby initially selected depending on the already present job chaperone data and the determined meta-information (Step S14 in FIG. 5). It is subsequently attempted to bring the meta-information and the already present job chaperone data into agreement with the process data, meaning that it is checked whether the already present job chaperone data and the meta-information regarding the process data are compatible (Step S15). If it is hereby established (Step S16) that the print data for the subsequent processing are complete and suitable but must be correspondingly prepared for an optimal processing in the following document processing processes, corresponding job chaperone data are generated from the meta-information (Step S17) that control the preparation of the print data in the subsequent document processing processes. This is the normal case, at least when the present method is executed on the print preparation computer 5, since here the print data are normally entirely present for a printout at a printing apparatus. Here they are optimized with the method according to the preferred embodiment with regard to the existing installation and application that enter into the method according to the preferred embodiment by means of the process data.

However, if it is established (Step S16) that the present print data are not suitable or not complete for the subsequent document processing processes—be it that the print data themselves are not correct or that corresponding job chaperone data are missing—a corresponding message is output to the user (Step S18) and the relaying of the print data is initially halted. The output of such a message primarily occurs at those computers at which the print data are generated or at which print data from different sources are merged into a print job, for example as is typical at the layout stations. The user is then requested (Step S19) to manually input additional job chaperone data via an input device so that the print data can be further processed. A list with corresponding job chaperone data is advantageously shown from which the user can select one or more job chaperone data. This list is generated automatically by the method and coordinated with the already present job chaperone data, meta-information and process data. After the manual input in Step S19, the method workflow returns to Step S16 in which the print data are rechecked for completeness and suitability.

A check of the print data for completeness using the determined meta-information regarding the completeness can even already make sense without consideration of the process data (without Step S15) and be executed at or immediately after the generation of the print data. The user can then supplement the print data with corresponding job chaperone data that allow an additional, optimal processing of the print data in the following document processing processes.

Figure 6:
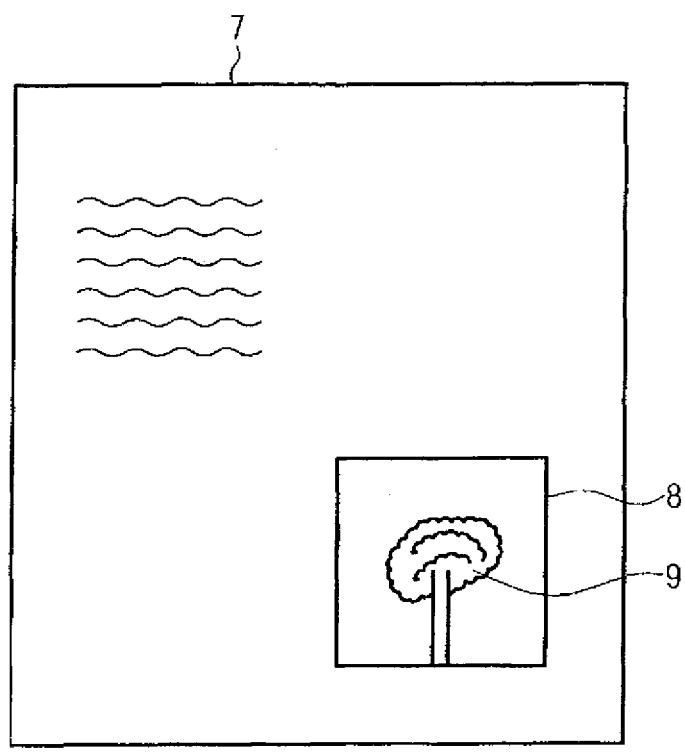
FIG. 6 is an example page of a document.

The effect of the method described in the preceding is explained in the following using the example page 7 shown in FIG. 6. This example page has a segment 8 in which is contained an image that shows a tree. Text is written in the remaining region of the example page 7.

If the job chaperone data contain the information that this example page should be printed in a large format (for example DIN A0), a print resolution of, for example, 300 dpi for the entire example page is then set by the method according to the preferred embodiment. This print resolution is a standard print resolution that can be processed quickly by the individual processing apparatuses. A higher print resolution frequently makes less sense in a large format print since it is hereby assumed that the observer views this page at some distance, such that he is not even in the position to detect a higher resolution. The print resolution is thus determined from the job chaperone data "print in large format".

However, if this example page should be printed out in a small format (for example DIN A5) for a catalog, this means that an observer can very well recognize the difference between a print with high or low print resolution. Therefore the available meta-information is consulted for the decision as to which print resolution should be selected. Given this example page the automatic analysis yields that a segment with an image is present and text is in the remaining region of the example page. The image is detected as a landscape image with a dominating body (the tree) and a uniform background (blue sky). Since the quality of the print output should be high, the tree 9 is printed with an optimally high print resolution of, for example, 1,000 to 1,200 dpi. A lower print resolution of, for example, 500 to 600 dpi is selected for the blue background in image 8. The region with the text is printed with a print resolution of only 300 dpi. Neither in the text nor in the background in the image would a higher print resolution lead to an increase of the quality of the printout since here no fine details are shown. A higher print resolution would merely lead to a significant delay of the printing process because a high print resolution requires a high computing cost. The tree 9 (that contrarily is provided with many details) must be printed with a high print resolution so that it can be printed with the desired quality. In the selection of the individual print resolutions the possibilities that the existing installation affords are also to be taken into account. It only makes sense to select print resolutions that can also actually be printed on the corresponding printing apparatus. In the method according to the preferred embodiment this information is taken into account in the form of process data.

In addition to the print resolution, diverse other parameters are determined automatically. The rastering method to be applied is cited only as one of many additional examples. There are different rastering methods that differ in the quality and the application. There are thus rastering methods that are better suited to rastering a text and rastering methods that are better suited to rastering images. The individual rastering methods also differ significantly in the computational cost. The suitable rastering method can be determined automatically or after inquiring with the user using the already present job chaperone data, the determined meta-information and the process data.

The method according to the preferred embodiment is provided both for application simultaneously with or immediately after generation of the print data and for application in a professional print environment in which print jobs are composed from multiple sources.

Print data from arbitrary sources are processed with the method according to the invention. The method according to the preferred embodiment also allows large quantities of print data with different contents and/or different job tickets to be processed with an electrophotographic printing system.

In conventional methods, the job chaperone data (in particular job tickets of print data originating from different sources) are often discarded. With the method according to the preferred embodiment, these job chaperone data are taken into account and transferred into a new set of job chaperone data. This new set of job chaperone data is normally stored in a job ticket. In the generation of this new set of job chaperone data, the existing job chaperone data are analyzed for conflicts and whether they are sufficient and/or absolutely necessary for the present print job.

The present preferred embodiment is not limited to the presentation parameters stated above in the example. The presentation parameters explained above serve merely for the explanation of the preferred embodiment.

The methods according to the preferred embodiment have been explained above using digital printing methods. The methods according to the invention are particularly suitable for heterogeneous print environments with different types of print apparatuses since the job chaperone data are generated or optimized using the process data. The method according to the preferred embodiment can therefore also be used in print environments that have classical print apparatuses insofar as the parameters can be read out automatically and be added to the process data.

An additional aspect of the present preferred embodiment concerns the automatic generation of job chaperone data for a print data stream. In conventional print data streams, the print data for a plurality of pages are transmitted into a data unit (for example in a file) with which job chaperone data are associated. These job chaperone data apply uniformly for the entire data unit and thus for all pages. However, it is often the case that individual regions within the data unit or individual pages within the data unit have different designs and are accordingly to be controlled with different job chaperone data.

Figure 7:
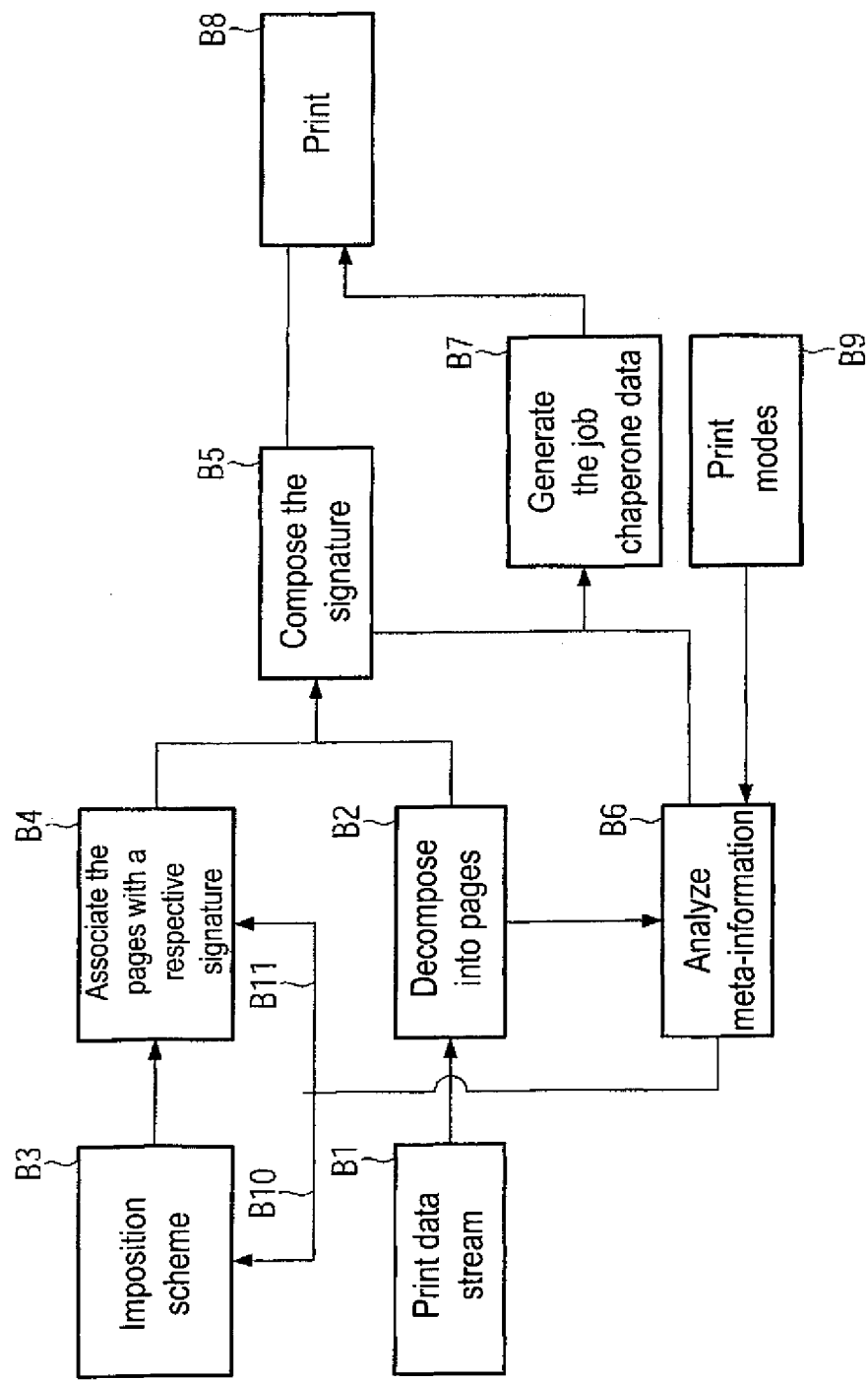
FIG. 7 is a method for per page disassembly of a print data stream to form signatures.

A corresponding workflow is explained using a block diagram shown in FIG. 7.

The incoming print data stream B1 can be an IPDS data stream, a PDF data stream or a print data stream in a different page description language (for example AFP, MO:DCA, PCL, Postscript, PPML, VDX, VPS, XML, VIPP, UPDS etc.) that comprises a plurality of pages to be printed. However, these pages are a common data unit, in particular a common print file, so that the job chaperone data contained in the print data stream respectively affect the entire data unit (and therefore at the same time a plurality of pages).

The print data stream or the data of the print file are automatically decomposed into individual regions. In the present exemplary embodiment it is automatically decomposed into individual pages (Step B2); however, the regions can also comprise multiple pages. The data unit is thereby not necessarily split up; rather, additional information describing the data unit can be generated that defines the subdivision of this data unit into the individual region or pages. This information already represents a first portion of automatically extracted meta-information.

For example, a per page decomposition can occur simply in what is known as a containerized AFP, MO:DCA or IPDS data stream, in particular a per page decomposition of PDF pages or Postscript pages or pages in another page description language that are embedded in the data stream as objects or what are known as object containers. For this the respective objects merely need to be examined, and the characteristic information for the decomposition (for example the information that the page contains a multicolored element) is determined from these objects in what is known as a parsing procedure. Since the scope of the object data is relatively small and the format of the respective objects is known, the decomposition can take place very quickly in an analysis and decomposition device, and the corresponding information (here color content) of the page is associated and stored.

Furthermore, an imposition scheme is provided (Step B3) according to which the individual pages are associated with a signature or, respectively, a use, i.e. are imposed (Step B4).

A signature or a use is a composition of multiple pages that are printed together on a common sheet or region of a recording medium web. The signature is selected such that method steps downstream of the printing process (in particular in cutting and folding apparatuses) can organize the individual pages from the printed sheets in the correct order or, for example, can fold the sheets such that the pages ultimately come to lie in a book in the correct page order.

Furthermore, the individual pages of the print data stream are analyzed for meta-information (Step B6). In the present exemplary embodiment, this meta-information is primarily information as to whether the pages contain exclusively a black-and-white presentation, a highlight color presentation or a full color presentation. Naturally other meta-information can also be analyzed.

The signatures composed in Step B4 are sorted in Step B5 according to their associated meta-information. For example, all signatures that contain only black-and-white print information are sorted together and signatures that contain full color print information are sorted together.

Furthermore, it can be provided that an imposition scheme is selected from different imposition schemes or is newly established (Step B10) in Step B3 based on the meta-information (determined in Step B6) of the pages, and the imposition order (Step B11) is accordingly adapted. A high degree of color separation can thereby be achieved overall in the signatures, such that optimally many signatures contain only black-and-white pages and each of the color signatures contains optimally many color pages.

The automatic decomposition of the print data stream into regions or pages (Step B2) and the extraction of the meta-information (Step B6) represents a print data data analysis with which a print data stream can be examined specific to the region. The analysis and decomposition of the print data stream are here affected or controlled by the properties of the printing apparatus to such an extent (Step B9) that they occur corresponding to the different operating modes ("single color printing" and "multicolor printing") of the printing apparatus according to the criteria "pure black-and-white pages" and "pages with color information".

Using this meta-information and the signature, job chaperone data are automatically generated (Step B7) that contain control parameters as to whether the respective signature is to be printed in single color printing, highlight color printing or full color printing. The signatures are then printed according to the stipulation of the corresponding job chaperone data at a printing apparatus (Step B8), wherein the printing apparatus is set corresponding to the generated job chaperone data. The individual signatures or regions are hereby printed according to the different job chaperone data so that signatures with pages that have only black-and-white presentation are printed in single color printing according to their sorting in a production cycle with unmodified apparatus setting (to black-and-white). If a signature has a single page with a highlight color presentation, the entire signature must thus be printed in highlight color printing. The same also applies for the case that a signature has a single page with a full color presentation, whereby the entire signature must be printed in full color printing.

Significant advantages are achieved via the automatic adaptation of the printing method or the printing apparatus used for printing for signatures that can be printed in single color printing. For example, if a printing machine is used that has a full color mode and a single color mode (for example what are known as electrophotographic color belt printing machines), then a significantly higher print speed (for example 800 pages/min) is normally achieved in single color mode relative to the full color mode (for example 100 pages/min). The entire printout can hereby be accelerated if the signatures to be printed in single color printing are printed with higher print speed. Such a color belt printing apparatus is marketed by the applicant under the name Océ VarioStream 9000 and is explained in "Digital Printing" (I.c.) in Chapter 8.4. Successive toner images with different color tones are hereby developed with different color tones, the color separations are collected on a transfer belt and these are finally transferred to a recording medium.

Given use of an inkjet printer that can alternately be operated in a single color mode and a multicolor mode, an advantage of the exemplary embodiment results in that, during the single color printing, the color nozzles can be driven into a rest position in which they are covered and are protected from drying out. The problem can thereby be solved that, in the printing of larger print jobs in multicolor or, respectively, full color mode with an inkjet printer, wherein larger regions are printed exclusively in one color the nozzles of the other colors dry during this printing process. This is avoided with the present method since the nozzles for the full color printing are only extended if a need also exists for this or if a plurality of full color print data are to be printed within a short time.

The signatures and the job chaperone data associated with them are advantageously grouped corresponding to the job chaperone data before the printing so that signatures with the same or similar job chaperone data are printed one following another, thus first for example those signatures that contain exclusively black-and-white print data in immediate succession or in a common black-and-white print cycle, and then signatures that contain multicolor print data in a second print cycle, for example a full color print cycle. This method is in particular appropriate if, to switch a printing apparatus between a full color mode and a single color mode, significant time is required in order to (for example) bring up the corresponding printing groups. In the event that such a grouping of the signatures is provided during the printing, it is appropriate to subsequently sort the groups of signatures automatically by means of an automatic sorting device that is downstream of the respective printing apparatus, corresponding to the signature order belonging to the finished book.

The method was explained above using an exemplary embodiment in which the pages are combined into signatures. However, this method is also suitable for the printing of successive pages that are not combined into signatures. It is significant that a print data stream is automatically subdivided with the method into pages or regions from which meta-information is extracted from which job chaperone data are generated so that job chaperone data for specific regions of a print data stream are generated automatically. Given a per page printing it can also be appropriate to group the pages depending on the same or similar job chaperone data and to successively print a group of pages.

An additional advantage of the described method is that, in what is known as a click charge usage fee model for printing apparatuses in which a user has to pay different prices for printed color pages and printed black-and-white pages, the billing unit (for example the page counter) can be simplified or be automatically adapted relatively easily because the corresponding page counts can be detected per block for black-and-white and color, for example.

In the preceding Specification of the preferred embodiment the generation and processing of document data streams was described multiple times in examples of print data streams. Print data streams are special embodiments of document data streams. However, document data streams can also be different formats of documents, for example formats of word processing systems such as the "doc" format of the software Microsoft Office Word, "xls" of Microsoft Office Xcel, e-mail formats etc. The preferred embodiment also extends to those and other document data streams or document data formats. Insofar as specific data streams or formats are cited in the exemplary embodiments, it is normally self-evident that other data streams or formats can also be used in this context.

The preferred embodiment can be summarized according to the following:

The invention concerns a method and a system for automatic preparation of print data for a printing process. Job chaperone data are generated automatically with the method according to the preferred embodiment using an analysis of print data and already existing job chaperone data, wherein process data are also taken into account that describe the subsequent document processing process. The job chaperone data thus contain control commands and parameters to control the subsequent document processing process. In particular, the job chaperone data are generated in that initially meta-information are extracted from the print data and job chaperone data, which meta-information is then converted into control commands and control parameters. Errors or fragments in the print data can also be established using the meta-information and the user can be notified if necessary.

Although preferred exemplary embodiments have been shown and described in detail in the drawings and in the preceding specification, they should be viewed as merely exemplary and not as limiting the invention. It is noted that only the preferred exemplary embodiments are presented and described, and all variations and modifications that presently and in the future lie within the protective scope of the invention should be protected.

The invention claimed is:

1. A method for automatically supplementing original job chaperone data provided with corresponding document data of a document processing job to be printed by a printer, comprising the steps of:
   with a computer, automatically analyzing the document data by means of a document data analysis to automatically generate first additional job chaperone data;
   with said computer, also automatically analyzing the original job chaperone data by means of a job chaperone data analysis independent of the document data in order to automatically generate second additional job chaperone data;
   with said computer, automatically taking into account in both the document data analysis and the original job chaperone data analysis processed data describing subsequent document processing processes in order to optimize the generated first and second job chaperone data for said subsequent document processing processes;
   with said computer, combining and associating the newly generated first and second additional job chaperone data and the already existing original job chaperone data for the document processing job; and
   printing the document processing job with the printer.

2. The method according to claim 1 wherein in the document data analysis said first additional job chaperone data are extracted from the document data according to predetermined document data criteria, and in the original job chaperone data analysis said second additional job chaperone data are extracted from the already existing original job chaperone data according to predetermined job chaperone data criteria.

3. The method according to claim 2 wherein the extraction of the first and second additional job chaperone data from the document data and the already existing original job chaperone data occurs in that meta-information is extracted from at least one of the document data or the original job chaperone data, and the extracted meta-information is converted into control commands and corresponding control parameters to control the subsequent document processing process that represent the job chaperone data supplemented by the first and second additional job chaperone data.

4. The method according to claim 1 wherein the document data are print data, and the print data analysis and the original job chaperone data analysis are executed during or immediately after generation of the print data or a print job containing the print data.

5. The method according to claim 3 wherein the meta-information is determined via comparison of different information of at least one of in the document data and in the already present original job chaperone data.

6. The method according to claim 3 wherein at least a portion of the meta-information is obtained in that document data present in an image data format are subjected to an image analysis method.

7. The method according to claim 6 wherein the document data are subdivided into multiple segments and the image analysis method is applied to the individual segments.

8. The method according to claim 6 wherein a frequency analysis to determine a resolution of the print data of a segment is used as the image analysis method.

9. The method according to claim 6 wherein at least one image analysis method from an expert system, a neural network or a fractal image analysis method is used as the image analysis method.

10. The method according to claim 6 wherein different image analysis methods that are selected depending on a respective data type of the segment are applied to different segments of the document data.

11. The method according to claim 3 wherein a printer selection is determined using a combination of at least one of the following parameters selected from the group consisting of resolution, format information, color space, and print run, and post-processing parameters are determined as the meta-information.

* * * * *